(No Model.)
M. CARRANZA & J. M. TINOCO.
ELECTRIC SELF WINDING TIME PIECE.
No. 401,006. Patented Apr. 9, 1889.
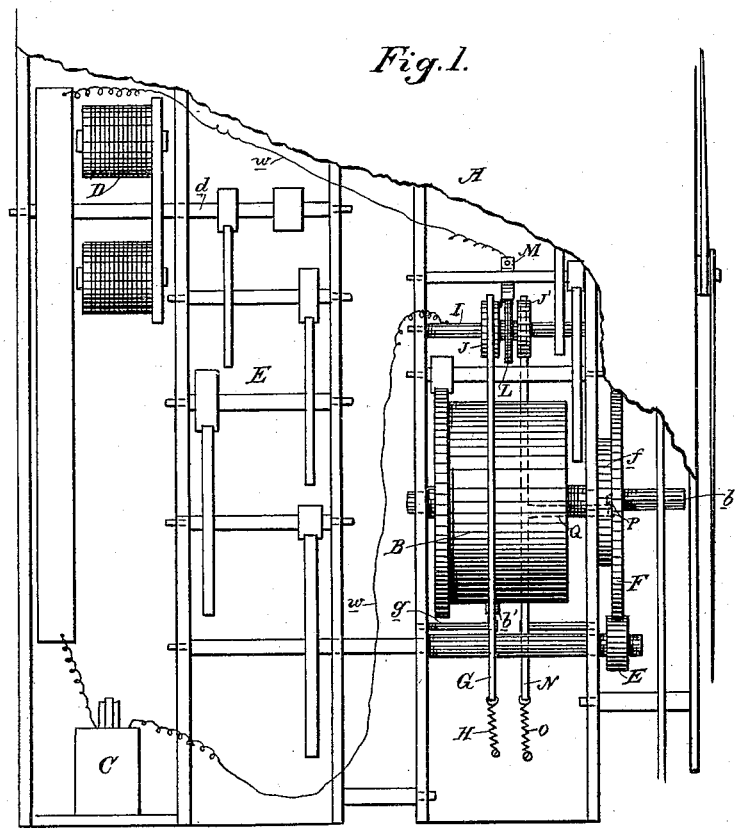
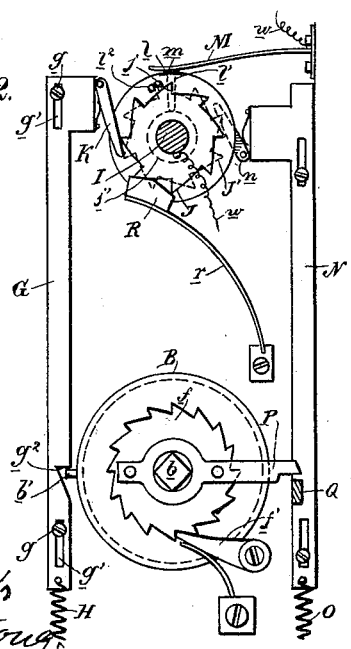
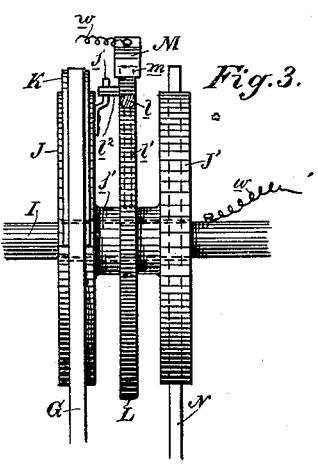
Witnesses,
Geo. H. Strong
J. A. Kruse
Inventors,
M. Carranza
J. M. Tinoco
By Dewey & Co.
atty

UNITED STATES PATENT OFFICE.

MANUEL CARRANZA, OF GUATEMALA, GUATEMALA, AND JOSÉ M. TINOCO, OF SAN FRANCISCO, CALIFORNIA.

ELECTRIC SELF-WINDING TIME-PIECE.

SPECIFICATION forming part of Letters Patent No. 401,006, dated April 9, 1889.

Application filed October 11, 1888. Serial No. 287,861. (No model.)

*To all whom it may concern:*

Be it known that we, MANUEL CARRANZA, of Guatamela, Republic of Guatemala, Central America, and JOSÉ MARIA TINOCO, of the city and county of San Francisco, State of California, have invented an Improvement in Self-Winding Time-Pieces; and we hereby declare the following to be a full, clear, and exact description of our invention.

Our invention relates to the class of time-pieces including clocks; and our invention consists in an electric motor connected with and adapted to drive the winding-arbor of the time-piece to wind up its spring, an electric circuit including the motor, and a novel mechanism actuated by the time-piece for closing and opening the electric circuit, whereby the motor is thrown into and out of action, all of which we shall hereinafter fully describe.

The object of our invention is to provide a time-piece so constructed that when it is nearly run down it shall be rewound by the automatic throwing into action of the electric motor.

Referring to the accompanying drawings for a more complete explanation of our invention, Figure 1 is a side elevation. Fig. 2 is an end view of the mechanism for throwing the motor into and out of action. Fig. 3 is an edge view of the ratchet-wheels J J' and rotary wheel L.

A is a clock-casing, in which is located the usual clock-work mechanism, of which the main drum B, inclosing the mainspring (not here shown) and the winding-arbor $b$, need only be referred to particularly. Located within the casing in a suitable position is a galvanic pile or other electric battery. (Here represented by C.)

D is a suitable electric motor located within the clock-casing, said motor being included in the electric circuit represented by wires $w$. The motor D has a shaft, $d$, which is geared up by the gear-train represented generally by E, with a gear-wheel, F, on the winding-arbor $b$, said arbor having also the usual ratchet-wheel, $f$, controlled by the spring-actuated pawl $f'$, so as to hold the spring when it is being wound up. It will be seen that the wheel F on the winding-arbor $b$ acts as a key applied to said arbor, and by rotating said wheel it will wind up the spring within the drum. If, therefore, the electric motor be set in operation, it will transmit motion to the wheel F, and will thus wind up the spring; but it will be obvious that the power of the motor will be needed only when the spring is about run down, when it must be thrown into action, and when the spring is wound up it must be thrown out of action. In order to do this, we have the following automatic mechanism for closing and opening the motor-circuit: Within the clock-casing is a vertically-movable pawl-bar, G, which is held by fixed screws $g$, passing through elongated slots $g'$ in the bar, so that said bar is guided in its vertical movement. A spring, H, secured to its lower end, serves to hold the bar down in normal position. On a shaft, I, above is a ratchet-wheel, J, loosely mounted thereon, and with the teeth of this wheel a depending spring-controlled pawl, K, secured to the upper end of the bar G, engages.

Upon the mainspring-drum B is a small projection or lug, $b'$, which is adapted by the rotation of the drum to come in contact with a notch, $g^2$, in the vertically-movable pawl-bar G, whereby said bar is moved upwardly. It will now be seen that at each rotation of the drum B the bar G will be raised by the lug $b'$ until said lug slips from its engagement with the notch $g^2$, whereupon the bar, being free, is drawn down again by its spring; but at the upward movement of the bar the pawl K slips over the back of a tooth of the ratchet J and engages it, and as the bar moves down the pawl turns said ratchet a distance of one tooth. Loosely mounted upon the same shaft, I, is a wheel, L, made of some non-conducting material, in the periphery of which is seated a metallic contact-piece, $l$, which makes connection with the metallic axis or shaft of the wheel by a metallic screw, $l'$.

M is a fixed spring carrying in its end a contact-piece, $m$, which bears upon the periphery of the wheel L. Upon the ratchet-wheel J is a lug, $j$, which is adapted to come in contact with a fixed pin, $l^2$, in the wheel L. One of the circuit-wires $w$ leads to the axis of the wheel L, while the other is connected with the spring M, thereby making the metal contact-pieces $l$ and $m$ the poles or electrodes of the circuit. Now, as the ratchet J is moved by the pawl K, as above described, its lug $j$ will finally come in contact with the fixed pin $l^2$ on the wheel L, thereby turning said wheel partially, so as to bring its contact-piece $l$ under the contact-piece $m$ of the spring M, and this closes the electric circuit, whereby the motor is set in operation in order to wind up the spring. These devices are so constructed and graduated that the circuit shall be closed just before the spring runs down. For example, if the mainspring-drum will make eight revolutions before stopping, the ratchet-wheel J should have eight teeth, so as to be moved through one-eighth of a revolution at each revolution of the drum, and the relative arrangement of the lug and pin of the ratchet and wheel is such that they shall come together upon the last movement of the ratchet, whereby the circuit is then closed.

Now, in order to open the circuit, so as to throw the motor out of action and to return the parts to original position in readiness for the motor to be again called into play, we have the following: Upon the other side is a vertically-movable pawl-bar, N, mounted and guided similarly to the pawl-bar G. This bar N carries a spring-controlled pawl, $n$, at its top, which is adapted to engage the teeth of a second ratchet-wheel, J′, on the downstroke. The spring O at the bottom of the bar serves to hold said bar up normally, the action of this spring being the reverse of the action of the spring of the bar G. The second ratchet-wheel, J′, is on the other side of the wheel L, but is connected with ratchet-wheel J by a sleeve, $j'$, both ratchet-wheels being thus mounted loosely on shaft I and independent of wheel L. The teeth of the ratchet-wheel J′ are oppositely arranged to those of ratchet-wheel J. Upon the ratchet-wheel $f$ of the winding-arbor $b$ is secured an arm, P, which is adapted by the rotation of said ratchet-wheel to come in contact with an arm, Q, extending from the movable pawl-bar N, whereby said bar is drawn downwardly. Now, when the motor has been set in operation and the spring is being wound up, the ratchet-wheel $f$ will be rotated, thereby bringing its arm P at each revolution into engagement with the arm Q of the movable bar N, so as to draw said bar downwardly. This movement of the bar N, through its pawl $n$ engaging the ratchet J′, turns said ratchet backwardly through a partial revolution at each movement, and with it the ratchet-wheel J, thereby carrying the lug $j$ of said last-named ratchet-wheel away from the pin $l^2$ of the wheel L until, when having made nearly a complete revolution, said lug comes in contact with the pin of the wheel from the other side and at the last moment forces the pin and its wheel back to its normal position, in which the contacts $l$ and $m$ are separated, thereby opening the circuit just as the clock-spring is wound up.

R is a brake-block supported by the spring-arm $r$ and operating against the teeth of the ratchet-wheel J, so as to control its movement and hold it in proper place.

Having thus described our invention, what we claim as new, and desire to secure by Letters Patent, is—

1. In a time-piece, the mainspring-drum and the winding-arbor, the electric motor connected with the winding-arbor, and an electric circuit, including the motor, in combination with the separable contacts forming the poles or electrodes of the circuit, a rotary wheel carrying one of the contacts, and a mechanism for operating the wheel, consisting of a ratchet-wheel having a lug, a fixed pin on the rotary wheel with which the lug of the ratchet-wheel is adapted to come in contact, a vertically-movable bar having a pawl for engaging and turning the ratchet-wheel, and the lug on the mainspring-drum for operating the movable bar, substantially as herein described.

2. In a time-piece, the mainspring-drum, the winding-arbor, and the holding ratchet-wheel thereon, an electric motor connected with the winding-arbor, and an electric circuit, including the motor, in combination with the separable contacts forming the poles or electrodes of the circuit, the rotary wheel carrying one of the contacts and having a fixed pin, the mechanism for moving the wheel to bring the contacts together and close the circuit, consisting of a ratchet-wheel, J, having a lug adapted to come in contact with the pin of the rotary wheel, the vertically-movable bar G, having the pawl engaging the teeth of the ratchet-wheel, and the lug on the mainspring-drum for operating the bar, and the mechanism for returning the rotary wheel to position and opening the circuit, consisting of the second ratchet-wheel, J′, connected with the ratchet-wheel J, the vertically-movable bar N, having an arm, Q, and a pawl for engaging the ratchet-wheel J′ and reversing both ratchet-wheels, and the arm P, secured to the holding-ratchet of the winding-arbor and adapted to engage and operate arm Q of the vertically-movable bar N, substantially as herein described.

It witness whereof we have hereunto set our hands.

MANUEL CARRANZA.
JOSÉ M. TINOCO.

Witnesses:
C. D. COLE,
J. H. BLOOD.